F. F. HOEFFLE.
SPRING.
APPLICATION FILED MAR. 10, 1921.
1,389,303.
Patented Aug. 30, 1921.
2 SHEETS—SHEET 1.
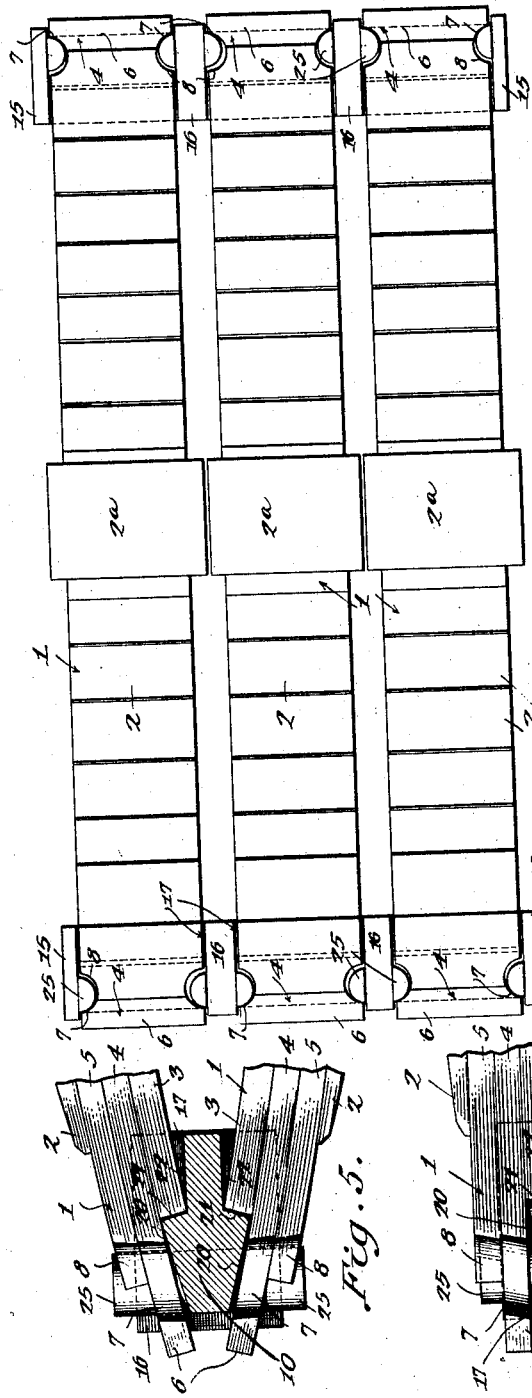
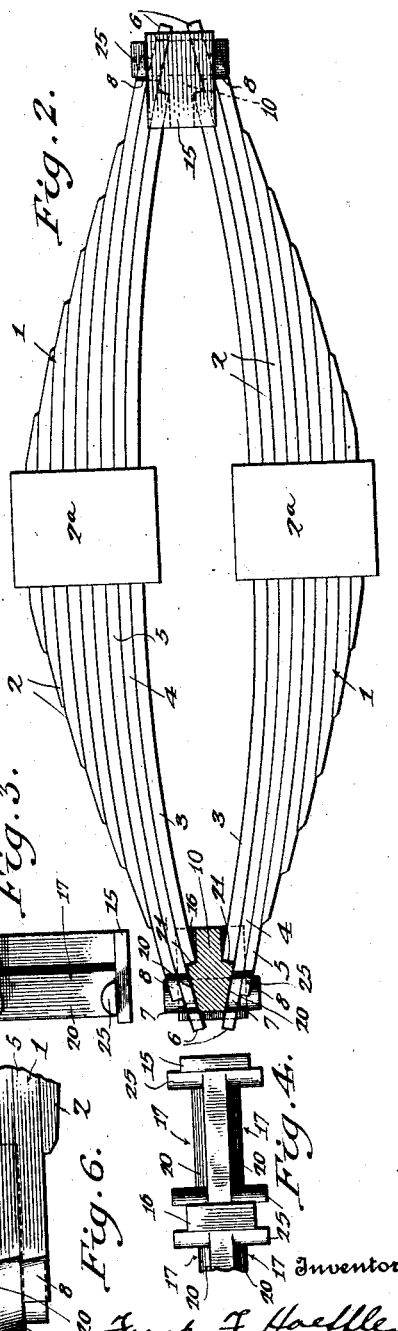
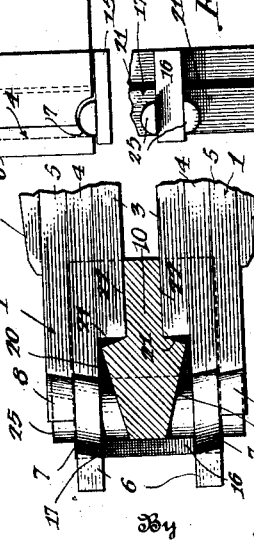
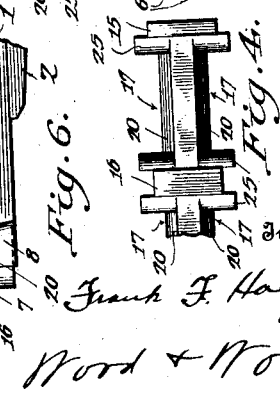
Inventor:
Frank F. Hoeffle
By Wood & Wood
Attorneys

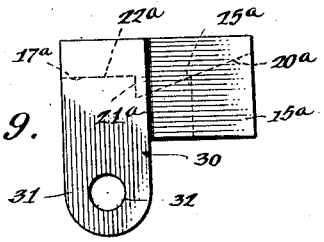
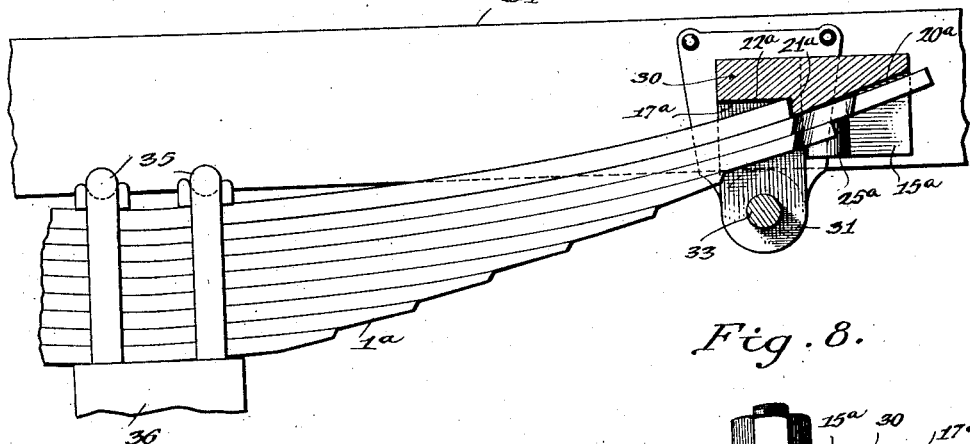
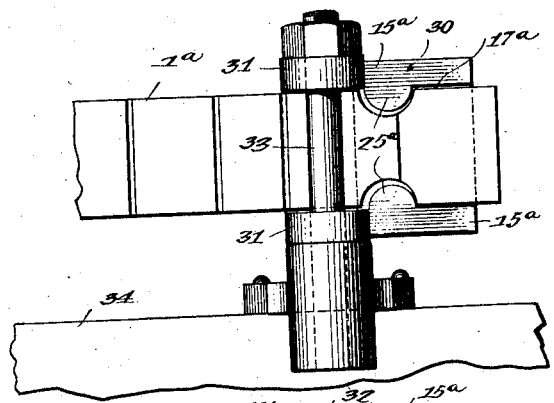
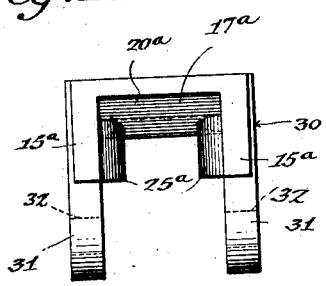

UNITED STATES PATENT OFFICE.

FRANK F. HOEFFLE, OF LOUISVILLE, KENTUCKY.

SPRING.

1,389,303.

Specification of Letters Patent. Patented Aug. 30, 1921.

Application filed March 10, 1921. Serial No. 451,265.

*To all whom it may concern:*

Be it known that I, FRANK F. HOEFFLE, a citizen of the United States, and residing at Louisville, in the county of Jefferson and State of Kentucky, have invented a new and useful Improvement in Springs, of which the following specification is a full disclosure.

My invention relates to improvements in elliptic springs and in particular to the means for supporting the ends of the leaves and for separating the adjacent ends of the opposing spring sections or halves, for either a single or plurality of units.

An object of the invention is to provide a support or shackle for the ends of the leaves of the elliptic types of springs of step construction, providing supporting surfaces in superposed planes for independently supporting the ends of a spring unit and an abutment or abutments for the end edge engagement of the leaves and in particular the base leaf of the series.

Another object of the invention relates to end bearings or shackles for supporting the ends of the flat or elliptic springs, providing a plurality of spring leaf supporting surfaces independently sustaining the adjacent base leaves of a series or of a unit, and for full elliptic type spacings and joining of the opposing halves or sections.

Another object of the invention is to provide an end block or shackle for supporting an end of the plural leaf elliptic or semi-elliptic spring having flat or square end leaves.

Another object of this invention is to entirely relieve the thrust strains for all but one of the leaves or laminations, by providing a connecting and anchoring means for the laminated half elliptic spring sections, which allows the free outward movement of certain of the said laminations, when the load is applied. The above object is furthered by providing a relatively thick base leaf or lamination, which alone receives and sustains the thrust strains of each adjacent lamination.

Another object is to eliminate the use of fastening devices, thus reducing the number of parts, and simplifying the assembling operation, two duplicate connecting and anchoring castings only being necessary for the assembling of a plurality of half elliptic spring sections.

Additional objects are to give strength and flexibility to the assembled sections at their junction points, and to preserve the full resiliency of the spring, this last object being furthered by extending the two leaves directly overlying the base leaf, beyond the said base leaf, to form bearing extensions contacting the bearing faces of the connecting and anchoring bar.

Other objects and certain advantages will be disclosed in the description of the drawings, forming a part of this specification, and special reference is made to said drawings, in which:

Figure 1 is a plan view showing a series of pairs of spring sections unitarily connected.

Fig. 2 is a side elevation of the structure of Fig. 1, one end being shown in cross section.

Fig. 3 is a plan view of an end portion of one of my tie bars.

Fig. 4 is a front elevation of the structure of Fig. 3.

Fig. 5 is a cross sectional view showing the action of my structure when sustaining a load.

Fig. 6 is a view similar to Fig. 5, showing the spring sections fully depressed.

Fig. 7 is an elevation partly in section illustrating a modified form of my invention, applicable to automobile construction.

Fig. 8 is a reverse plan of the structure of Fig. 7.

Figs. 9 and 10 are respectively an elevation and plan of my reversible anchoring and suspension block.

Fig. 11 is an end view of the same.

The numeral 1 generally designates semi-elliptic spring sections, each section being composed of a suitable number of spring leaves or laminations, generally indicated at 2, each leaf having plane end fastened together centrally as at $2^a$. The spring as a whole is made up of pairs of opposing spring sections 1, each spring section comprising a relatively thick and heavy base leaf or lamination 3, and two specially constructed bearing leaves respectively 4 and 5, consecutively overlying and overlapping the leaf 3. The ends of each leaf 4 project beyond the ends of each heavy base leaf 3, and each projecting portion 6 is provided at its edges with opposite transversely alined semi-circular notches 7. Each end of each leaf 5 is provided with opposite quarter-circular corner notches 8, overlying the semi-circular notches 7, and of equal radius therewith.

In order to couple and anchor the ends of a series of opposed pairs of spring sections 1, to form a multiple spring structure for supporting heavy loads, I provide an anchor block, or shackle 10, designed to slidingly support and to anchor the projecting portions of the leaves 4 and 5, and to provide thrust abutments for the ends of the heavy base leaves 3.

The spring illustrated represents a triplex full elliptic with the end blocks unitarily connecting the three spring units and separating the opposing ends of the sections of each unit. The compound form of structure shown herein is merely illustrative, the improvement being applicable to any of the various types of flat leaf elliptic or semi-elliptic springs.

Each block is substantially arrow-shaped or stepped in cross-section, throughout its length, providing superposed plane surfaces and an intermediate abutment or shoulder, the plane surfaces being designed to support and anchor three pairs of spring sections. Each block is provided with vertically disposed end walls 15 and with vertical partitions 16, defining pockets 17, of slightly greater width than the leaves or laminations 3, 4, 5, said leaves having a flexible sliding fit within said pockets.

The arrow-shaped cross sectional configuration of each block 10, provides outwardly convergent upper and lower bearing surfaces 20, (for each pocket 17) inwardly facing upper and lower thrust receiving shoulders 21, and upper and lower inner parallel bearing surfaces 22.

The blocks 10 are each further provided on the opposite vertical faces of the partitions 16 and upon the inner vertical faces of the end walls 15, with inwardly facing semi-circular anchoring bosses 25, designed to loosely coact with notches 7 and 8, of the leaves 4 and 5, the radii of the bosses being less than those of the said notches.

When the half spring sections are sustaining no load, the outer extremities of the semi-circular notches 7 rest near to or against the outer sides of the anchoring bosses 25, and the projecting portions 6, of the leaves 4, lie against the bearing surfaces 20 of the pockets 17. When, however, the spring sections are flexed under load, the ends of the heavy base springs are thrust outwardly against the shoulders 21, pivoting thereabout as the leaves are flattened. As this flattening of the leaves continues, the projecting ends 6, of the leaves 4, are raised from the bearing surfaces (see Figs. 5 and 6) and the inner extremities of the semi-circular notches 7 and quarter-circular notches 8 travel toward the inner side of the bosses 25, but at all times the said notches remain in flexible anchoring engagement with said bosses.

By allowing for the free endwise movement of the leaves, the same are relieved from strain, and resulting mutilation of their fiber. The ends of the relatively thick and heavy base leaves 3 are especially treated to receive and sustain thrust strains. By placing the notches 7 and 8 beyond the bearing portions of the leaves, the spring structure as a whole is not weakened and the full resiliency of the spring is retained. Relatively broad bearings are provided for the extensions of the leaves 4, and the extensions of the leaves 5, overlap the extensions 6, of the said leaves 4, sufficiently to reinforce the end structure.

No separate fastening devices are required for the anchoring of the leaves and a flexible, yet substantial combination is obtained. The leaf ends being plane produces a leaf of the simplest form and minimum cost of manufacture. There is no injury or weakening of the metal as in a construction in which the leaf ends are provided with gibs or anchoring means formed by swaging or otherwise.

In Figs. 7 to 11 inclusive is illustrated a modified form of my invention wherein the principles thereof are applied particularly to vehicle spring suspension. Although I have illustrated but one of such applications, I contemplate others, in which a reversible feature of my suspension and anchoring clip furthers general improvement in the spring suspension art.

The numeral 30 designates a reversible suspension and anchoring clip or block, providing a spring terminal receiving pocket 17$^a$, vertically disposed side walls 15$^a$, bearing surfaces 20$^a$ and 22$^a$, a thrust shoulder 21$^a$, and anchoring bosses 25$^a$, all similar in construction and function to that of the first form of my invention. Extending from the side walls 15$^a$ are perforated attaching ears 31, the alined perforations 32 therein being designed to engage either loosely or rigidly a horizontal bearing stub shaft or spindle 33, attached to the frame 34 of a vehicle. The ends of the laminated half-elliptic spring section 1$^a$, similar in construction to the sections 1 of the first form of my invention are engaged with the clip or clips 30, as shown, the said section being anchored as at 35 to the axle 36.

The opposite end of the spring section (not shown) engages a similar clip 30. A single clip 30 may be used to support a quarter elliptic spring section as suggested by the showing of Fig. 7. It will be understood that I do not limit myself to the use of this form of clip 30, as herein illustrated, but contemplate various applications of the anchoring and suspending principle.

Having described my invention, I claim:

1. A leaf spring end support comprising a member having a stepped face providing leaf sustaining surfaces and an intermediate abutment, the surfaces respectively slidingly supporting plane ends of superposed leaves of the spring with the butt end of the main or base leaf adapted to engage said abutment.

2. A leaf spring end support comprising a member having stepped faces on opposite sides, each face providing leaf sustaining surfaces and an intermediate abutment, and separating the opposing sections of the spring surfaces of each face respectively, slidingly supporting plane ends of superposed leaves of the spring with the end of the main or base leaf adapted to engage said abutment.

3. In a leaf spring, an end support comprising a member having a recessed stepped face providing leaf sustaining surfaces and an intermediate abutment, and plane end spring leaves respectively slidingly supported upon said surfaces with the butt of the main or base leaf adapted to engage said abutment.

4. In a leaf spring, an end support comprising a member having on its opposite sides recessed stepped faces, each face providing leaf sustaining surfaces and an intermediate abutment, and opposite disposed leaf spring sections engaged into respective opposite sides of said member, and separated thereby, the primary leaves of each spring section having plane butt ends respectively slidingly supported upon said surface with the main or base spring thereof adapted to engage said abutment.

5. In a leaf spring, an end support comprising a member having a recessed stepped face providing a leaf receiving pocket with independent first and second leaf sustaining surfaces and an end abutment for the first leaf, and first and second spring leaves engaged with the first leaf thereof, having a butt end for engagement with said abutment.

6. An end support comprising a member having a recessed stepped face providing a spring leaf receiving pocket for independently socketing and sustaining the first and second leaves of a spring.

7. In a leaf spring, an end support comprising a member, having a recessed stepped face, providing a spring leaf receiving pocket for independently socketing and sustaining the first and second leaves of a spring, and a main spring having a butt end loosely engaged in the pocket of said member and adapted to engage against a shoulder formed by said stepped face.

8. In a leaf spring, an end support comprising a member having a recessed stepped face, having surfaces in step arrangement for independently sustaining the respective ends of the leaves of the spring, first and second spring leaves loosely engaged into the rearward face of said member, the end of the second overlapping the first, and having an interlocking engagement with the member for confining its longitudinal movement upon said member.

In witness whereof, I hereunto subscribe my name, as attested by the two subscribing witnesses.

FRANK F. HOEFFLE.

Witnesses:
L. A. BECK,
J. C. JUNIUS.